US006631380B1

United States Patent
Cason et al.

(10) Patent No.: US 6,631,380 B1
(45) Date of Patent: Oct. 7, 2003

(54) COUNTING AND DISPLAYING OCCURRENCES OF DATA RECORDS

(75) Inventors: Stanley Philip Cason, Johnson City, NY (US); Debra Lynn Zeggert, Binghamton, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/363,669

(22) Filed: Jul. 29, 1999

(51) Int. Cl.⁷ .............................................. G06F 17/00
(52) U.S. Cl. ........................ 707/102; 707/100; 715/503
(58) Field of Search ................................ 707/503, 509, 707/517, 1–10, 100–103, 104.1; 715/503, 509, 517

(56) References Cited

U.S. PATENT DOCUMENTS

| | | | |
|---|---|---|---|
| 5,371,675 A | 12/1994 | Greif et al. | 364/419.1 |
| 5,467,471 A | 11/1995 | Bader | 395/600 |
| 5,727,204 A | 3/1998 | Greene, VII | 395/613 |
| 5,752,025 A | 5/1998 | Shakib et al. | 395/613 |
| 5,778,370 A | 7/1998 | Emerson | 707/100 |
| 5,794,042 A | 8/1998 | Terada et al. | 395/701 |
| 5,832,475 A | 11/1998 | Agrawal et al. | 707/2 |
| 5,880,742 A | 3/1999 | Rao et al. | 345/440 |
| 5,883,623 A | 3/1999 | Cseri | 345/335 |

FOREIGN PATENT DOCUMENTS

| | | | |
|---|---|---|---|
| EP | 410452 | 1/1991 | G06F/15/20 |
| JP | 1232425 | 9/1989 | |
| JP | 2025966 | 1/1990 | |

OTHER PUBLICATIONS

Freeman (posting on Notes.net website, http://www–10.lotus.com/ldd/46dom.nsf/55c38d716d632d9b8525689b005ba1c0/f15d8747ceed8dd385256634005c0983?OpenDocument, 1 page, Jul. 1, 1998).*
Tamura et al. (Lotus Notes and Domino Server 4.6 unleashed, SAMS, 1997, electronic version, pp. 317 and 323).*
Dovervik (posting on Notes.net website, http://www–10.lotus.com/ldd/46dom.nsf/55c38d716d632d9b8525689b005ba1c0/b3d6bf5a46f4a6d48525664e0032daa8?OpenDocument, 1 page, Jul. 27, 1998.*
Chester et al. (Mastering Excel 97 Fourth Edition, SYBEX, 1997, ISBN 0–7821–1921–2, the whole book).
Tamura et al., Lotus Notes and Domino Server 4.6 unleashed, SAMS, 1997, electronic version, pp. 257, 263, 307–312, and 374–376.
Tamura et al., Lotus Notes and Domino Server 4.6 unleashed, SAMS, 1997, electronic version, pp. 257, 263, 307–312, and 374–376.*

(List continued on next page.)

*Primary Examiner*—Kim Vu
*Assistant Examiner*—Joon Hwan Hwang
(74) *Attorney, Agent, or Firm*—Schmeiser, Olsen & Watts; William E. Schlesser

(57) ABSTRACT

Occurrences of data records in a non-relational database are counted by first selecting rows of data records. A counter field is created and appended to the selected rows. The counter field is weighted with a fixed value which may be different for different selected rows. A summation is performed on the weighted counter fields to count and subsequently display occurrences of data records. Various counts may be dynamically displayed in response to selection of sort columns in a view of the selected rows of data records.

17 Claims, 8 Drawing Sheets

OTHER PUBLICATIONS

Magnum, Sarah A., posting on Notes.net website, Jul. 24, 1998.

Dovervik, Anders, posting on Notes.net website, Jul. 27, 1998.

Hayes, Daniel P., posting on Notes.net website, Jul. 29, 1998.

Smith, Kenn, posting on Notes.net website, Jul. 29, 1998.

Bilgin, Asli, posting on Notes.net website, Feb. 16, 2000.

Research Disclosure RD–324019, "Method for fully referencing tables . . . ", Mar. 20, 1991—Abstract.

* cited by examiner

FIG. 3

| Job Task - Jobs\ By Business Area - View - Lotus Notes | | | | | |
|---|---|---|---|---|---|
| File  Edit  View  Help | *27* | | *25* | | *23* |
| ▼ ۹ Job Trak | Opened | Business Area | Program | Activity | Customer | Count |
| ▼ ۹ Admin | ▼04/1999 | | | | | 4 |
| ۹ Customer | | ▼Development | | | | 3 |
| ۹ DB Rules | | | ▼GPS | | | 1 |
| ۹ Employee | | | | ▼T2 | | 1 |
| ۹ Keywords | | | | | ▼Richard Wold | 1 |
| ▼ ۹ Work Types | | | | | | |
| ۹ All | | | ▼RDI | | | 2 |
| ۹ Job | | | | ▼T1 | | 2 |
| ۹ Jobs | | | | | ▼Dave Zeggert | 2 |
| ۹ All Jobs | | | | | | |
| ۹ By Business Area | | ▼Manufacturing | | | | 1 |
| ۹ Temp | | | ▼Treat? Tower | | | 1 |
| ▶ ۹ Labor | | | | ▼Line Down | | 1 |
| ▶ ۹ My Labor | | | | | ▼Richard Wold | 1 |
| ۹ All Documents | | | | | | |
| ▶ ۹ My Labor | ▼05/1999 | | | | | 1 |
| ۹ Agents | | ▼Manufacturing | | | | 1 |
| ▼ ☐ Design | | | ▼Central Sourcing | | | 1 |
| ☐ Forms | | | | ▼Line Down | | 1 |
| ☐ Views | | | | | ▼Richard Wold | 1 |
| ☐ Folders | | | | | | *5* |
| ☐ Shared Fields | | | | | | |
| ☐ Subforms | | | | | | *21* |
| ☐ Navigators | | | | | | |
| ☐ Script Libraries | | | | | | |
| ☐ Other | | | | | | |

FIG. 4

| Job Task - Jobs\ By Business Area - View - Lotus Notes | | | | | | |
|---|---|---|---|---|---|---|
| File Edit View Help | | 27 | 25 | | 23 | |
| ▼ Q Job Trak | Opened | Business Area | Program | Activity | Customer | Count |
| ▼ Q Admin | | | | ▼Line Down | | 2 |
|     Q Customer | ▼04/1999 | | | | | 1 |
|     Q DB Rules | | | | | | |
|     Q Employee | ▼05/1999 | | | | | 1 |
|     Q Keywords | | | | | | |
|   ▼Q Work Types | | | | ▼T1 | | 2 |
|     Q All | ▼04/1999 | | | | | 2 |
|     Q Job | | | | | | |
| Q Jobs | | | | ▼T2 | | 1 |
|   Q All Jobs | ▼04/1999 | | | | | 1 |
|   Q By Business Area | | | | | | |
|   Q Temp | | | | | | 5 |
| ▶ ⊕ Labor | | | | | | |
| ▶ Q My Labor | | | | | | |
|   Q All Documents | | | | | | |
| ▶ ⊕ My Labor | | | | | | |
|   Q Agents | | | | | | |
| ▼ ☐ Design | | | | | | |
|   ☐ Forms | | | | | | |
|   ☐ Views | | | | | | |
|   ☐ Folders | | | | | | |
|   ☐ Shared Fields | | | | | | |
|   ☐ Subforms | | | | | | |
|   ☐ Navigators | | | | | | |
|   ☐ Script Libraries | | | | | | |
|   ☐ Other | | | | | | |

FIG. 5

| Job Task - Jobs\ By Business Area - View - Lotus Notes | | | | | | |
|---|---|---|---|---|---|---|
| File  Edit  View  Help | | 27 | | 25 | 23 | |
| ▼ Q. Job Trak | Opened | Business Area | Program | Activity | Customer | Count |
| ▼ Q. Admin | | ▼Development | | | | 3 |
|   Q. Customer | ▼04/1999 | | | | | 3 |
|   Q. DB Rules | | | | | | |
|   Q. Employee | | | | | | |
|   Q. Keywords | | ▼Manufacturing | | | | 2 |
|   Q. Work Types | ▼04/1999 | | | | | 1 |
|     Q. All | | | | | | |
|     Q. Job | ▼05/1999 | | | | | 1 |
|   Q. Jobs | | | | | | |
|     Q. All Jobs | | | | | | 5 |
|     Q. By Business Area | | | | | | |
|     Q. Temp | | | | | | |
| ▶ ⊗. Labor | | | | | | |
| ▶ Q. My Labor | | | | | | |
|   Q. All Documents | | | | | | |
| ▶ ⊗. My Labor | | | | | | |
|   Q. Agents | | | | | | |
| ▼ ☐ Design | | | | | | |
|   ☐ Forms | | | | | | |
|   ☐ Views | | | | | | |
|   ☐ Folders | | | | | | |
|   ☐ Shared Fields | | | | | | |
|   ☐ Subforms | | | | | | |
|   ☐ Navigators | | | | | | |
|   ☐ Script Libraries | | | | | | |
|   ☐ Other | | | | | | |

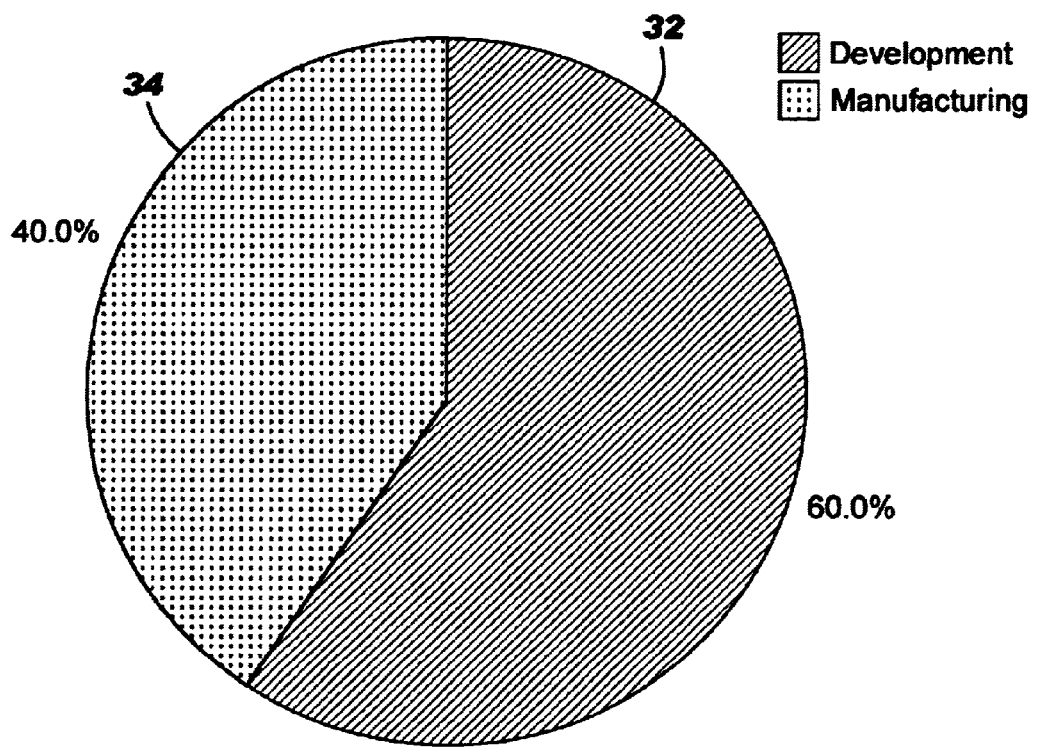

COUNTING AND DISPLAYING OCCURRENCES OF DATA RECORDS

TECHNICAL FIELD

The invention relates to methods and systems for assisting users of computer databases. More particularly the invention relates to ways of counting and displaying occurrences of data records in databases. Even more particularly the invention relates to such ways as applied to non-relational databases.

BACKGROUND OF THE INVENTION

Computer and information system users are familiar with handling data stored in a database. One well-known form of database, displays stored data in the form of a spreadsheet having rows and columns where data either numeric or text, formulas, or graphical information is placed at the intersection of a particular row and a particular column, typically called a cell. The text may also include reference to other data such as a URL (uniform reference locator) address of a web page on the internet where the other data is stored.

Another type of well-known database is a hierarchical database. As defined in the *Dictionary of Computing* @ 1987 published by IBM Corporation, Box 390, Poughkeepsie, N.Y. 12602 document SC20-1699-07, a hierarchical database is "organized in the form of a tree structure in which each record" . . . "has only one owner, that represents how the records" . . . "are interrelated, and that predetermines the access paths to data stored in the base."

In a network database "each record except the root record may have several owners and there may be several access paths to each record" as defined in the Dictionary of Computing.

Another type of database is a relational database which is defined in the Dictionary of Computing as "a database that is organized and accessed according to relationships between data items" . . . "Data items are accessed by matching values and not by following pre-defined paths."

All of the databases described above except the last as well as many others are known in the art as non-relational databases. It is well known that some databases have data added and removed very frequently often by many users. For example a purchasing database at a large company may be updated at any time by any buyer in the purchasing function. This may be several hundred employees located at various sites worldwide.

A common problem that exists with data stored in non-relational databases is determining the numbers of occurrences of a particular category or sub-category of data in the database. In the example above, a purchasing manager may need to know how many purchase orders were placed in the preceding week by any of the buyers. Or (s)he may need to have this information displayed by category of purchase order.

Current tools for accessing non-relational databases permit summing of the values in fields of records. For example to quickly determine the total dollar value of all selected purchase orders a user would invoke a sum function or formula. In some spreadsheets a user would enter in a cell the formula=SUM ( ) where the cell positions of the desired data to be summed are indicated within the parenthesis. The spreadsheet program then forms the sum and places the result in the cell containing the formula. However, with some non relational database tools such as Lotus Notes, a user who wishes to count the number of items of data in a category or sub category has no corresponding counting formula to use. It is therefore a desirable objective to have a method of counting occurrences of data items.

With some spreadsheet database tools such as Lotus 1,2,3-97 Edition a built-in count function may be used to count the number of nonblank cells in a range of cells. It is also well known in the art to store only the nonblank cells and not store the blank cells. While providing some limited counting capability, this built-in count function may not address all requirements for counting occurrences in the stored data such as weighting one type of data record occurrence differently than another. To check for a balance, one type may be weighted with a value of +1 and another type weighted −1. In this case the number of data record occurrences should equal zero. An alternative method of counting occurrences with less restrictive capability would be a desirable improvement in the use of such spreadsheet database tools.

Shakib et al in U.S. Pat. No. 5,752,025 describe a way of organizing and viewing large amounts of data by creating and displaying a categorization table for a set of data records. The categorization table organizes data under successive, often heirarchical, and expandable levels of categorized headings. Such headings give a user information as to the nature of the underlying sub-headings or data grouped under particular headings or sub-headings. The categorization table is built from a header table which itself is built by sorting data records or an index table to the data records by pre-defined categories. A count value field in the header table gives the number of data records in each sort category so that if it is desired to access the data for a particular category, that data can be accessed by knowing the location of the first record and the number of records in that particular category. The size of the header table is usually much less than the data records themselves and therefore permits display of various categorization tables without sorting through the data records each time a new view or new categorization table is requested by a user.

In accordance with the teachings of the present invention, there is defined a new method of counting occurrences of data items of a particular category or sub-category in a non-relational database. It is believed that such a method would constitute a significant advancement in the art.

OBJECTS AND SUMMARY OF THE INVENTION

It is therefore a principal object of the present invention to enhance the computer database art by providing a broad method of counting occurrences of data items.

It is another object to provide a method of displaying the number of occurrences of data items.

It is another object to provide a data processing apparatus for counting occurrence of data items in a non-relational database.

It is yet another object to provide a computer program product of program instruction means recorded on a computer readable medium for counting occurrences of data item in a database.

These and other objects are attained in accordance with one embodiment of the invention wherein there is provided a method of counting occurrences of data in a non-relational database, comprising the steps of, selecting rows of data from a non-relational database, creating a counter field and appending the counter field to the selected rows, weighting the counter field with a fixed value, and applying a summation to the counter field to count occurrences of the selected rows of data.

In accordance with another embodiment of the invention there is provided a method of displaying data records in a non-relational database, comprising the steps of, selecting data records from a non-relational database, creating a counter field and appending the counter field to the selected data records, weighting the counter field with a fixed value to form weighted occurrences, sorting the selected data records into categories, applying a summation to the counter field to count weighted occurrences of the selected data records in each category, and displaying the sorted data records by columns of the categories and a column indicating the weighted occurrences for each category.

In accordance with another embodiment of the invention there is provided a data processing apparatus for counting occurrences of data in a non-relational database, the apparatus comprising, means for selecting rows of data from a non-relational database, means for creating a counter field and appending the counter field to the selected rows, means for weighting the counter field with a fixed value, and means for applying a summation to the counter field to count occurrences of the data.

In accordance with yet another embodiment of the invention there is provided a computer program product for counting occurrences of data in a non- relational database, the computer program product comprising, a computer readable medium, first program instruction means for selecting rows of data from a non-relational database, second program instruction means for creating a counter field and appending the counter field to the selected rows, third program instruction means for weighting the counter field with a fixed value, fourth program instruction means for applying a summation to the counter field to count occurrences of the data; and wherein all said program instruction means are recorded on the medium.

BRIEF DESCRIPTION OF THE DRAWINGS

FIG. 3 shows a view of data records with total number of occurrences;

FIG. 4 shows another view of data records sorted by activity, with number of occurrences;

FIG. 5 shows yet another view of data records sorted by business area, with number of occurrences;

FIG. 6 shows a pie chart graphical display of data records indicating number of occurrences by category.

BEST MODE FOR CARRYING OUT THE INVENTION

For a better understanding of the present invention, together with other and further objects, advantages and capabilities thereof, reference is made to the following disclosure and the appended claims in connection with the above-described drawings.

Figure 1:
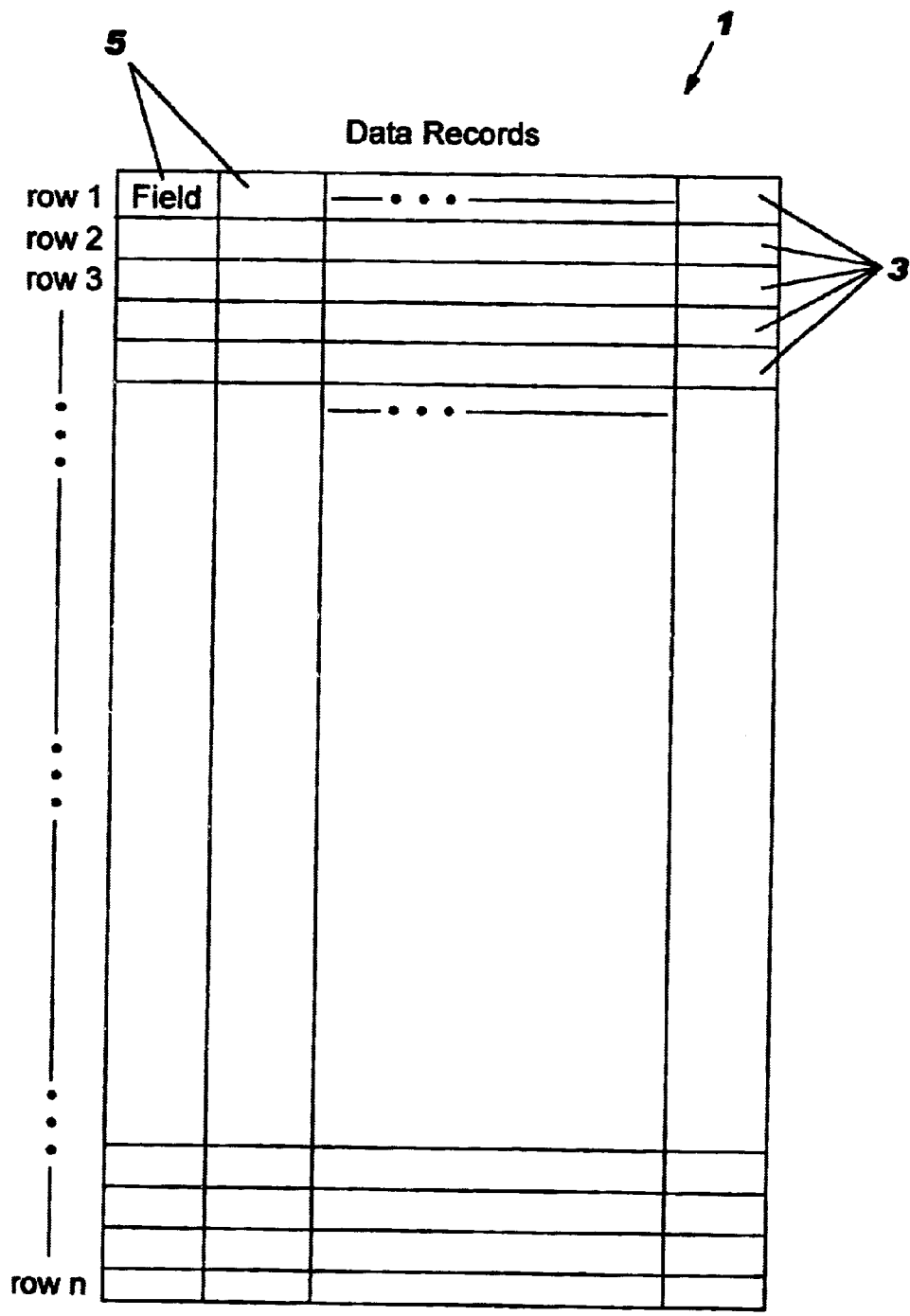
FIG. 1 shows data records stored in a non-relational database.

In FIG. 1 there is shown a non-relational database 1 of data records 3 arranged in rows. For convenience of reference and not as a limitation, the rows are numbered sequentially from 1 to n. Within each row a series of fields 5 may contain text data or any other type of data including numeric, alphanumeric, binary, references or any other type of data known to be stored in a database. Some pre-defined fields of some data records may at some point in time contain no data at all and the field is then usually referred to as blank. Such database collections of data records are well known in the art as described above. The fields may have titles 7 as shown in FIG. 2a.

Figure 2A:
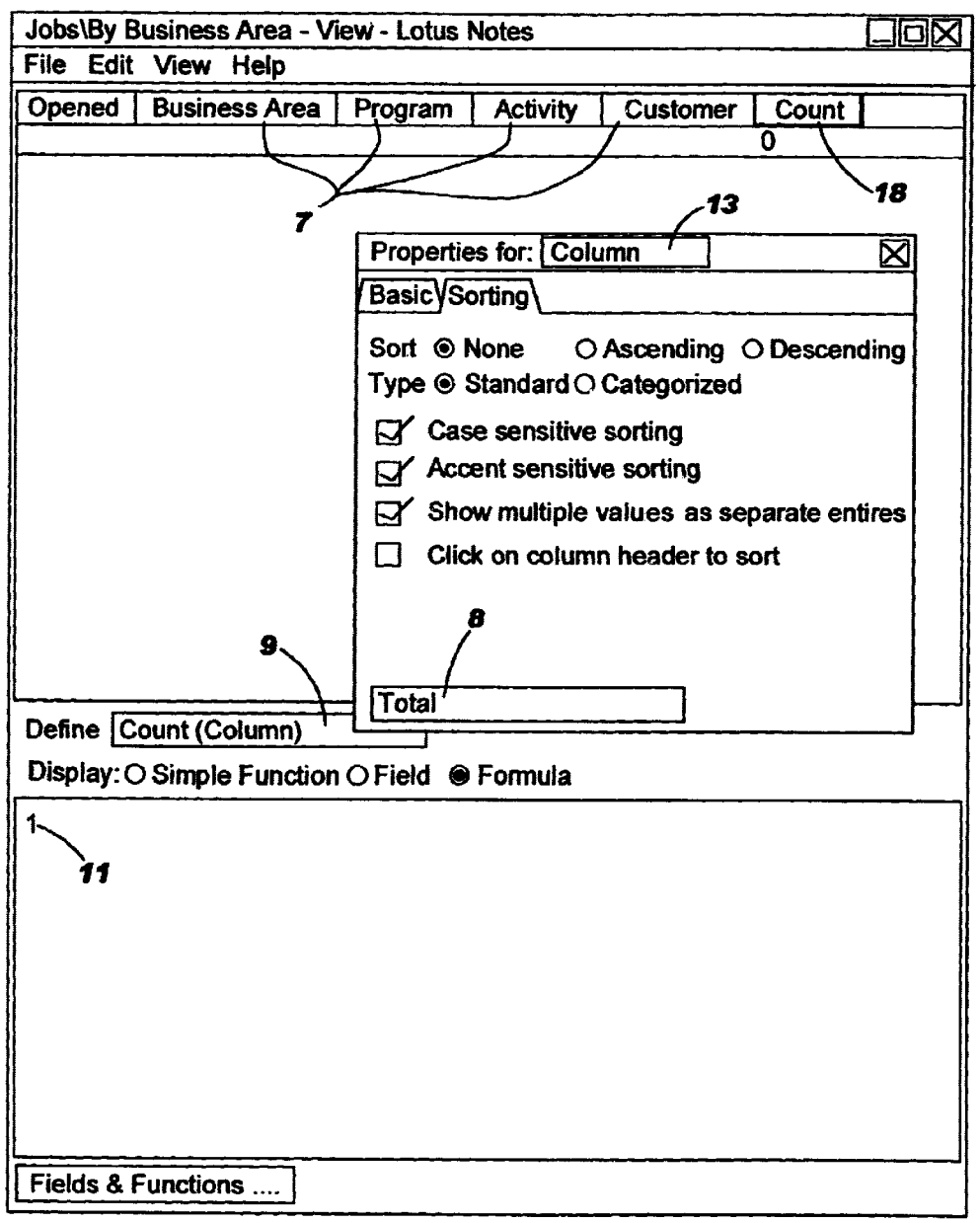
FIGS. 2a and 2b shows creating a counter field appended to selected rows of data records.
Figure 2B:
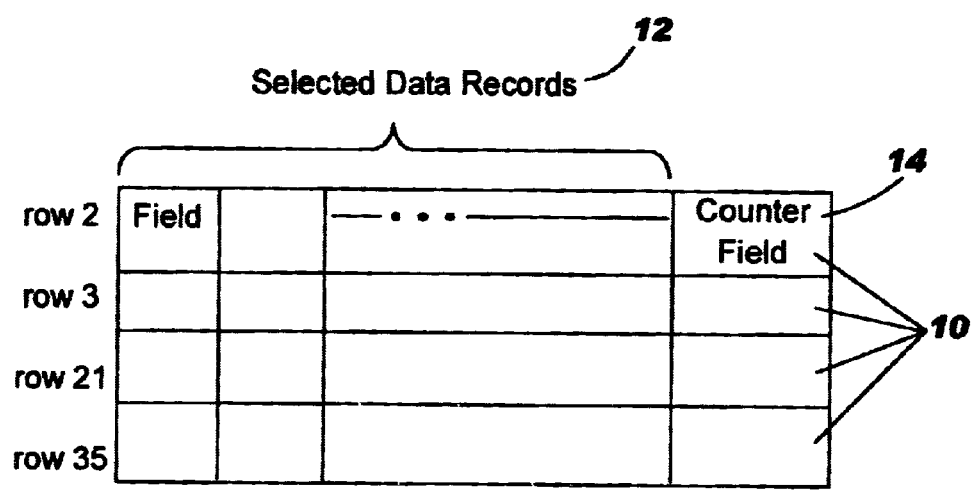

Individual rows 10 of data records can be selected from the database 1 according to any criteria and arranged 12 as shown in FIG. 2b. For example the data rows may be grouped by a common attribute such as grouping all the rows for one business area above those for another business area. A counter field 14 is created 9 as shown in FIGS. 2a–2b and appended to the selected rows 10. The counter field is weighted with a fixed value. In FIG. 2a the fixed value is one 11, however any numerical value may be used. Furthermore the fixed value may be a different value for each selected row 10 or groups of rows. For example the fixed value in one type of data record may be set equal to +1 to indicate to count this type of record while in another type of record the fixed value can be zero to indicate these second records should not be included in the count. In another case, true/false and other logical counting can be performed by weighting with +1 for true and zero for false. As noted above, weighting of +1 for one type of record and −1 for another allows counting to check for a balance or zero count between two types of records.

In FIG. 2a the counting field is created as a column 13 appended to the rows of data records and named count 9. The fixed values 11 in the count field are counted by applying a summation 8 to the weighted fixed values and thereby counting occurrences of selected records as described above.

In FIG. 3 there is shown a display of data records and the results of applying a summation to count occurrences of data records located in a column 21 counter field labeled count 23. A user may indicate another view selection by clicking on the column labeled Activity 25, dynamically producing the new view and new summations shown in FIG. 4. Clicking on business area 27 likewise dynamically produces the new view and new summations as shown in FIG. 5, effectively sorting data records into categories and sub-categories.

In one embodiment, each data record represents a business project. A count of the number of projects, particularly where there are a large number is used to determine the level of effort needed or number of employees needed to complete the projects. A count of completed projects indicates the record of accomplishment to date. In order to efficiently allocate resources, business executives frequently need to be provided with a count of projects, often sorted by type. The projects are counted by appending a counter field to data records for the projects. The counter field is weighted with a fixed value and a summation is applied to the counter field to count weighted occurrences. The count may then be displayed in numerical or graphical form.

Those skilled in the art will recognize that the various summations which represent a count of occurrences of selected data records can also be depicted graphically such as by a bar graph, line graph, or a pie chart 30 as shown in FIG. 6 or by any other type of graphical output. Wedges 32 and 34 of the pie chart depict by their relative sizes, the percentage of data records sorted by business area into Development and Manufacturing respectively. FIG. 5 shows the corresponding actual count by business area in column 23. The step of constructing a graph may make the results of applying a summation easier for a user to visualize or understand and compare. Those skilled in the art will also recognize that the step of constructing a graph can be readily combined with the step of applying a summation into one set of executable instructions in applications where such combination is desirable. Other steps may also be combined without departing from the invention herein.

A general purpose computer or data processing apparatus executes program instructions to perform the selecting, creating, appending, weighting, applying a summation, sorting and displaying functions described. These operations singularly or in any combination may also be performed by specially designed logic hardware, firmware, or software using techniques well-known in the art for such logic design. Program instructions for performing the functions may be stored within a data processing apparatus. They may also be recorded on a computer readable medium such as a CD Rom, floppy disk, hard drive, ROM, EPROM or other medium known in the art without departing from the invention.

Figure 7:
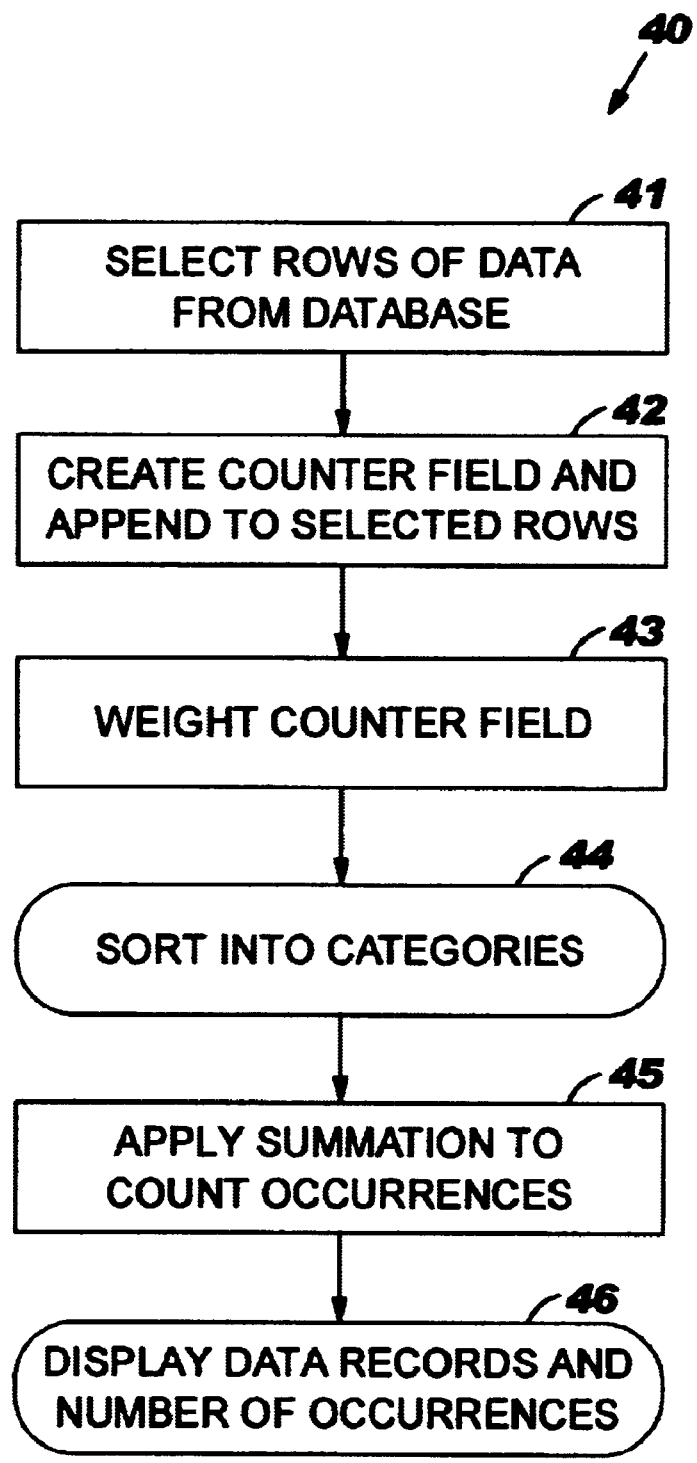
FIG. 7 is a flow chart depicting the operation of the present invention.

In FIG. 7 there is shown a flowchart 40 of a method embodiment of the present invention. Required steps 41–43, 45 are enclosed in rectangular borders while optional steps 44, 46 have curved borders. In step 41 rows of data 3 are selected from the database 1. In step 42 a counter field 14 is created and appended to the selected rows 10. In step 43 the counter field is weighted with a fixed value. The selected data may be sorted into categories in step 44. In step 45 a summation is applied to the counter fields to count occurrences of data records and in step 46 the data records and number of occurrences may be displayed. As already noted above, the display may be created in either textual or graphical form.

While there have been shown and described what are at present considered the preferred embodiments of the invention, it will be obvious to those skilled in the art that various changes and modifications may be made therein without departing from the scope of the invention as defined by the appended claims.

What is claimed is:

1. A method of counting occurrences of data records in a non-relational database, comprising, the steps of:
   selecting data records from a non-relational database;
   creating a counter field and appending said counter field to each of said selected data records;
   weighting said counter field with a fixed value;
   sorting said selected data records into categories; and
   applying a summation to said counter field to count occurrences of said selected data records in each said category.

2. The method of claim 1, wherein said sorting comprises sorting into categories and sub-categories.

3. The method of claim 2, further comprising applying a summation to said counter field to count occurrences of said selected data records in each of said categories and sub-categories.

4. The method of claim 3, further comprising the step of selecting a primary sort column and sorting said selected data records by said primary sort column.

5. A method of displaying data records in a non-relational database, comprising the steps of:
   selecting data records from a non-relational database;
   creating a counter field and appending said counter field to said selected data records;
   weighting said counter field with a fixed value to form weighted occurrences;
   sorting said selected data records into categories;
   applying a summation to said counter field to count weighted occurrences of said selected data records in each said category; and
   displaying said sorted data records by columns of said categories and a column indicating said weighted occurrences for each said category.

6. The method of claim 5, further comprising sorting said selected data records into categories and sub-categories and displaying said selected data records by columns of said categories and sub-categories.

7. A method of displaying data records in a non-relational database, comprising the steps of:
   selecting data records from a non-relational database;
   creating a counter field and appending said counter field to said selected data records;
   weighting said counter field with a fixed value to form weighted occurrences;
   sorting said selected data records into categories;
   applying a summation to said counter field to count weighted occurrences of said selected data records in each said category; and
   constructing a graph wherein said summation for each said category is indicated graphically.

8. The method of claim 7, wherein said graph is constructed as a pie chart.

9. A data processing apparatus for counting occurrences of data records in a non-relational database, said apparatus comprising:
   means for selecting data records from a non-relational database;
   means for creating a counter field and appending said counter field to each of said selected data records;
   means for weighting said counter field with a fixed value;
   means for sorting said selected data records into categories; and
   means for applying a summation to said counter field to count said weighted occurrences of said selected data records in each said category.

10. The apparatus of claim 9, wherein said means for sorting further comprises means for sorting into categories and sub-categories.

11. The apparatus of claim 10, wherein said means for applying a summation further comprises means for applying a summation to said counter field to count said weighted occurrences of said selected data records in each of said categories and sub-categories.

12. A data processing apparatus for displaying data records in a non-relational database, said apparatus comprising:
   means for selecting data records from a non-relational database;
   means for creating a counter field and appending said counter field to said selected data records;
   means for weighting said counter field with a fixed value to form a weighted number of occurrences;
   means for sorting said selected data records into categories;
   means for applying a summation to said counter field to count weighted occurrences of said selected data records in each said category; and
   means for displaying said sorted data records by columns of categories and a column indicating said weighted occurrences for each said category.

13. The apparatus of claim 12, including means for sorting said selected data records into categories and sub-categories and means for displaying said selected data records by columns of said categories and sub-categories.

14. A data processing apparatus for displaying data records in a non-relational database, said apparatus comprising:
- means for selecting data records form a non-relational database;
- means for creating a counter field and appending said counter field to said selected data records;
- means for weighting said counter field with a fixed value to form a weighted number of occurrences;
- means for sorting said selected data records into categories;
- means for applying a summation to said counter field to count weighted occurrences of said selected data records in each said category; and
- means for constructing a graph wherein said summation for each said category is indicated graphically.

15. The apparatus of claim 14, wherein said graph is a pie chart.

16. A computer program product for displaying data records in a non-relational database, said computer program product comprising:
- a computer readable medium;
- First program instruction means for selecting data records from a non-relational database;
- second program instruction means for creating a counter field and appending said counter field to said selected data records;
- third program instruction means for weighting said counter field with A fixed value to form weighted occurrences;
- fourth program instruction means for sorting said selected data records into categories;
- fifth program instruction means for applying a summation to said counter field to count said weighted occurrences of said selected data records in each said category;
- sixth program instruction means for displaying said sorted data records by columns of categories and a column indicating said weighted occurrences for each said category; and wherein
- all said program instruction means are recorded on said medium.

17. Computer executable process steps operative to control a computer, stored on a computer readable medium, for displaying data records in a non-relational database, comprising:
- a stop to select data records from a non-relational database;
- a step to create a counter field and append said counter field to said selected data records;
- a step to weight said counter field with a fixed value to form a weighted number of occurrences;
- a step to sort said selected data records into categories;
- a stop to apply a summation to said counter field to count weighted occurrences of said selected data records in each said category; and
- a step to construct a graph wherein said summation for each said category is indicated graphically.

* * * * *